(12) United States Patent
Block et al.

(10) Patent No.: US 10,440,506 B2
(45) Date of Patent: *Oct. 8, 2019

(54) LOCATION-BASED TICKET BOOKS

(71) Applicant: Apple Inc., Cupertino, CA (US)

(72) Inventors: Eliza Block, San Francisco, CA (US);
George R. Dicker, Sunnyvale, CA (US); Glen W. Steele, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/145,746

(22) Filed: Sep. 28, 2018

(65) Prior Publication Data

US 2019/0037342 A1    Jan. 31, 2019

Related U.S. Application Data

(63) Continuation of application No. 14/871,972, filed on Sep. 30, 2015, now Pat. No. 10,104,495, which is a
(Continued)

(51) Int. Cl.
*H04W 4/021* (2018.01)
*H04W 4/02* (2018.01)
(Continued)

(52) U.S. Cl.
CPC ............ *H04W 4/021* (2013.01); *G06Q 10/02* (2013.01); *G06Q 30/06* (2013.01);
(Continued)

(58) Field of Classification Search
CPC ......... H04W 4/021; H04W 4/80; H04W 4/02; H04W 84/112; G06Q 10/02; G06Q 30/06; H04M 1/72597
See application file for complete search history.

(56) References Cited

U.S. PATENT DOCUMENTS 9,125,014 B2    9/2015 Block et al.
2003/0179734 A1    9/2003 Tsutsumi
(Continued)

FOREIGN PATENT DOCUMENTS

WO    WO 2010/084404    7/2010
WO    WO 2010/138631    12/2010
(Continued)

OTHER PUBLICATIONS

Chinese Office Action in Application No. 201480032662.5, dated Jan. 26, 2018, 23 pages (with English translation).
(Continued)

*Primary Examiner* — Mazda Sabouri
(74) *Attorney, Agent, or Firm* — Jaffery Watson Mendonsa & Hamilton LLP

(57) ABSTRACT

Location-based ticket books are described. A mobile device can present a virtual ticket to a service provider based on a location of the mobile device. The mobile device can receive a virtual ticket for accessing a service from a service provider. The virtual ticket can be associated with a signal source. The signal source can be pre-programmed to broadcast a beacon signal that includes an identifier identifying the signal source. The signal source can be placed at a venue where the service is available. The mobile device, upon arriving at the venue, can detect the beacon signal from the signal source. In response, the mobile device can activate a ticket manager. The ticket manager can automatically select, from a ticket book, the virtual ticket associated with the signal source. The mobile device can present content of the selected virtual ticket at the venue where the service is available.

20 Claims, 7 Drawing Sheets

Related U.S. Application Data continuation of application No. PCT/US2014/040062, filed on May 29, 2014, which is a continuation of application No. 13/913,489, filed on Jun. 9, 2013, now Pat. No. 9,125,014.

(51) Int. Cl.
*H04W 4/80* (2018.01)
*G06Q 30/06* (2012.01)
*G06Q 10/02* (2012.01)
*H04M 1/725* (2006.01)
*H04W 84/12* (2009.01)

(52) U.S. Cl.
CPC ......... *H04M 1/72597* (2013.01); *H04W 4/02* (2013.01); *H04W 4/80* (2018.02); *H04W 84/12* (2013.01)

(56) References Cited

U.S. PATENT DOCUMENTS

| | | |
|---|---|---|
| 2004/0128197 A1 | 7/2004 | Bam et al. |
| 2005/0208892 A1 | 9/2005 | Kotola et al. |
| 2006/0094405 A1 | 5/2006 | Dupont |
| 2006/0143098 A1 | 6/2006 | Lazaridis |
| 2010/0082491 A1 | 4/2010 | Rosenblatt et al. |
| 2010/0205305 A1 | 8/2010 | Bajko |
| 2011/0110282 A1 | 5/2011 | Wu et al. |
| 2011/0238476 A1 | 9/2011 | Carr et al. |
| 2012/0099800 A1 | 4/2012 | Llano et al. |
| 2012/0296826 A1 | 11/2012 | Bergdale et al. |
| 2012/0323664 A1 | 12/2012 | Klems |
| 2013/0005404 A1 | 1/2013 | Bremer |
| 2013/0268997 A1 | 10/2013 | Clancy, III et al. |
| 2013/0282536 A1 | 10/2013 | Mohazzabfar et al. |
| 2014/0045536 A1 | 2/2014 | Sydir et al. |
| 2014/0068778 A1 | 3/2014 | Bhatia |
| 2014/0364148 A1 | 12/2014 | Block et al. |
| 2016/0071409 A1 | 3/2016 | Suomela |

FOREIGN PATENT DOCUMENTS

| | | |
|---|---|---|
| WO | WO 2011/055183 | 5/2011 |
| WO | WO 2012/021267 | 2/2012 |
| WO | WO 2013/025770 | 2/2013 |

OTHER PUBLICATIONS

European Extended Search Report for application No. 14734655.5, dated Feb. 21, 2017, 9 pages.
European Office Action in Application No. 14734655.5, dated Dec. 14, 2017, 9 pages.
International Search Report and Written Opinion, International Application No. PCT/US14/40062, dated Mar. 10, 2015, 6 pages.

LOCATION-BASED TICKET BOOKS

CROSS-REFERENCE TO RELATED APPLICATIONS

This application is a continuation of and claims priority to U.S. patent application Ser. No. 14/871,972, filed Sep. 30, 2015 (to be issued as U.S. Pat. No. 10,104,495 on Oct. 16, 2018), which claims priority to PCT Application No. PCT/US2014/040062, filed May 29, 2014, which claims priority to U.S. patent application Ser. No. 13/913,489, filed Jun. 9, 2013 (now U.S. Pat. No. 9,125,014, issued Sep. 1, 2015), the entire contents of each of which are incorporated herein by reference.

This application is related to co-pending U.S. Provisional Application No. 61/790,813, entitled "Proximity Fence," filed on Mar. 15, 2013, and co-pending U.S. application Ser. No. 13/905,552, entitled "Range Class Estimation for Radio Frequency Devices," filed on May 30, 2013, the entire contents of each of which are incorporated herein by reference.

TECHNICAL FIELD

This disclosure relates generally to providing location-based services on a mobile computing device.

BACKGROUND

Some mobile devices can be programmed to provide a ticket book service. A person can use a mobile device to buy a ticket, accept a coupon, or add a gift card from a service provider (e.g., an airline, a movie chain, a coupon-issuing shop, or a restaurant). In response, the service provider can issue a virtual ticket by sending an electronic message (e.g., an electronic mail message) to the mobile device. The mobile device can prompt the person to add the virtual ticket included in the electronic message to a ticket book. The ticket book can store a user's various virtual tickets, e.g., boarding passes, movie tickets, retail coupons, loyalty cards, on the mobile device. When the person arrives at a place where the virtual ticket can be used, e.g., a flight gate, a movie theater entrance, or a shop, the person can launch an application program that manages the ticket book service. The mobile device can display all virtual tickets stored in the ticket book for selection. The user can select a relevant ticket. The application program can display the user-selected ticket on the mobile device, for inspection by a ticket reader machine or a person.

SUMMARY

Location-based ticket books are described. A mobile device can be programmed to present a virtual ticket to a service provider based on a location of the mobile device. The mobile device can receive a virtual ticket for accessing a service from a service provider. The virtual ticket can be associated with a signal source. The signal source can be pre-programmed to broadcast a beacon signal that includes an identifier identifying the signal source. The signal source can be placed at a venue where the service is available. The mobile device, upon arriving at the venue, can detect the beacon signal from the signal source. In response, the mobile device can activate a ticket manager. The ticket manager can automatically select, from a ticket book, the virtual ticket associated with the signal source. The mobile device can present content of the selected virtual ticket at the venue, where the service is available.

The features described in this specification can be implemented to achieve one or more advantages. For example, compared to a conventional mobile device, a mobile device implementing location-based ticket book services can be more user friendly. A user presenting virtual passes, store cards, or coupons can do so more easily. A location-based ticket book can automatically present a virtual ticket that is relevant to a current location, instead of requiring the user to make a selection. For example, if the user has a virtual store card at a coffee shop, when the user walks into the coffee shop, the user can unlock a mobile device screen. Based on the location of the mobile device, the mobile device can provide a barcode of the virtual store card for display to a barcode scanner of the coffee shop to use the virtual store card. The user need not search through multiple tickets to find the virtual store card for the coffee shop.

In addition, the features described in this specification can allow service providers to provide services that are both standardized and individualized. For example, if multiple coffee shops are in a franchised coffee shop chain, and the franchised coffee shop chain wishes to have a standardized promotion across the chain, the franchised coffee shop chain can provide a pre-configured wireless beacon to each franchised shop. Each pre-configured wireless beacon can broadcast a same signal source identifier. A mobile device can then display a virtual ticket to access the same promotion in each of the coffee shops. In addition, if the franchised coffee shop chain wishes to have an individualized promotion (e.g., an experimental promotion in a pilot program) in one or more franchised shops, the franchised coffee shop chain can distribute wireless beacons having another signal source identifier to the one or more shops. The mobile device, upon entering these shops, can display tickets for accessing the individualized promotion.

The details of one or more implementations of location-based ticket books are set forth in the accompanying drawings and the description below. Other features, aspects, and advantages of location-based ticket books will become apparent from the description, the drawings, and the claims.

BRIEF DESCRIPTION OF THE DRAWINGS

Like reference symbols in the various drawings indicate like elements.

DETAILED DESCRIPTION

Exemplary Location-Based Ticket Book Service

Figure 1:
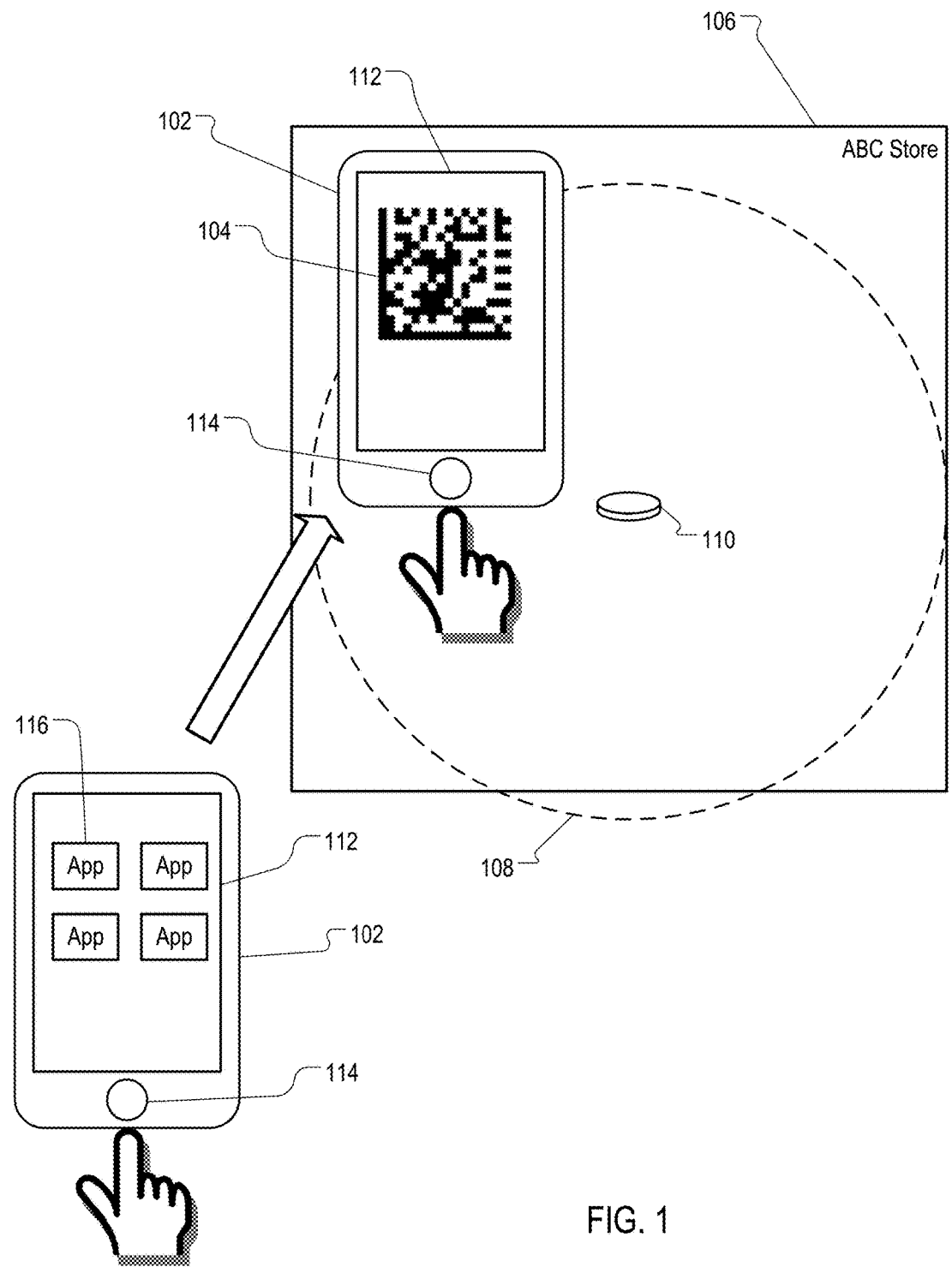
FIG. 1 is a diagram illustrating an exemplary location-based ticket book service.

FIG. 1 is a diagram illustrating an exemplary location-based ticket book service. Mobile device 102 can be a computing device programmed to present virtual pass 104 upon entering venue 106. Virtual pass 104 can be a pass for accessing a service. The pass can be a text message, an image, or a one-dimensional or two-dimensional barcode readable by a barcode scanner. Some examples of virtual pass 104 are airline or movie tickets, store cards, discount coupons, gift cards, employee passes, gymnasium access passes, or library cards.

Venue 106 can be a stationary location (e.g., a shop in a building) or a mobile location (e.g., a food truck, cruise ship, or airplane) where the service is available. Venue 106 can be represented by virtual fence 108, which is defined by signal source 110. Virtual fence 108 can be a conventional geofence or a proximity fence. The proximity fence can be a location-agnostic fence defined by signal source 110 having no geographic location information (e.g., no point location fixed to latitude and longitude coordinates). Signal source 110 can be a radio frequency (RF) signal transmitter broadcasting a beacon signal. The beacon signal can include a signal source identifier associated with signal source 110. Additional details of the signal source identifier are described below in reference to FIG. 3A. The signal source identifier can be associated with virtual pass 104 of mobile device 102 in a virtual ticket. Additional details of the virtual ticket are described below in reference to FIG. 3B.

Mobile device 102 can be programmed to trigger a display of virtual pass 104 upon determining that mobile device 102 is located at venue 106. Mobile device 102 can determine that mobile device 102 is in venue 106 upon determining that mobile device 102 entered into virtual fence 108. Mobile device 102 can determine that mobile device 102 entered into virtual fence 108 upon detecting the beacon signal of signal source 110. Mobile device 102 can determine a signal source identifier from the beacon signal. Mobile device 102 can determine that the signal source identifier matches a signal source identifier associated with virtual pass 104. Accordingly, mobile device 102 can automatically select virtual pass 104 for presentation over other virtual passes stored on mobile device 102.

Mobile device 102 can display virtual pass 104 upon determining that mobile device 102 is in an active operating mode. In the active operating mode, display surface 112 of mobile device 102 is activated and unlocked. Mobile device 102 can receive a user input, e.g., a tap on an icon associated with a ticket book application program. In response, mobile device 102 can present virtual pass 104 upon launching of the ticket book application program for display on display surface 112. Upon selecting virtual pass 104, mobile device 102 can hide other virtual passes from display.

When mobile device 102 has been idle for a pre-specified duration, mobile device 102 can enter a power-saving operating mode. In the power-saving operating mode, display surface 112 of mobile device 102 can be inactive or locked. Some components of mobile device 102 may still operate in the power-saving operating mode. For example, a wireless processor configured to scan for wireless beacon signals may operate periodically. Upon detecting an event of crossing of virtual fence 108 when mobile device 102 is in the power-saving operating mode, mobile device 102 can store the crossing event in a registry on a storage device of mobile device 102. The crossing event can include a signal source identifier of signal source 110, detected during the power-saving operating mode.

Mobile device 102 can transition from the power-saving operating mode to the active operating mode upon receiving an input. The input can be a user input, for example, a user pressing home button 114 of mobile device 102. Home button 114 can be a physical button on a front side of mobile device 102. Upon receiving the input, mobile device 102 can perform a search in the registry to determine if an event indicates that mobile device 102 is in a virtual fence associated with a virtual pass.

Upon determining that no such virtual fence is found, mobile device 102 can display a home screen on display surface 112. The home screen can be a default user interface configured by a user or by mobile device 102 to display on display surface 112 when mobile device 102 is activated from a power-saving operating mode. The home screen can include one or more icons 116 representing application programs.

If mobile device 102 determines an event stores in the registry indicates that mobile device 102 entered virtual fence 108, mobile device 102 can determine the signal source identifier from the event. Mobile device 102 can determine that the signal source identifier matches a signal source identifier associated with virtual pass 104 based on information in the ticket book. Based on the match, mobile device 102 can provide virtual pass 104 for display on display surface 112. Virtual pass 104 can be displayed in place of the home screen or other user interface item.

Figure 2:
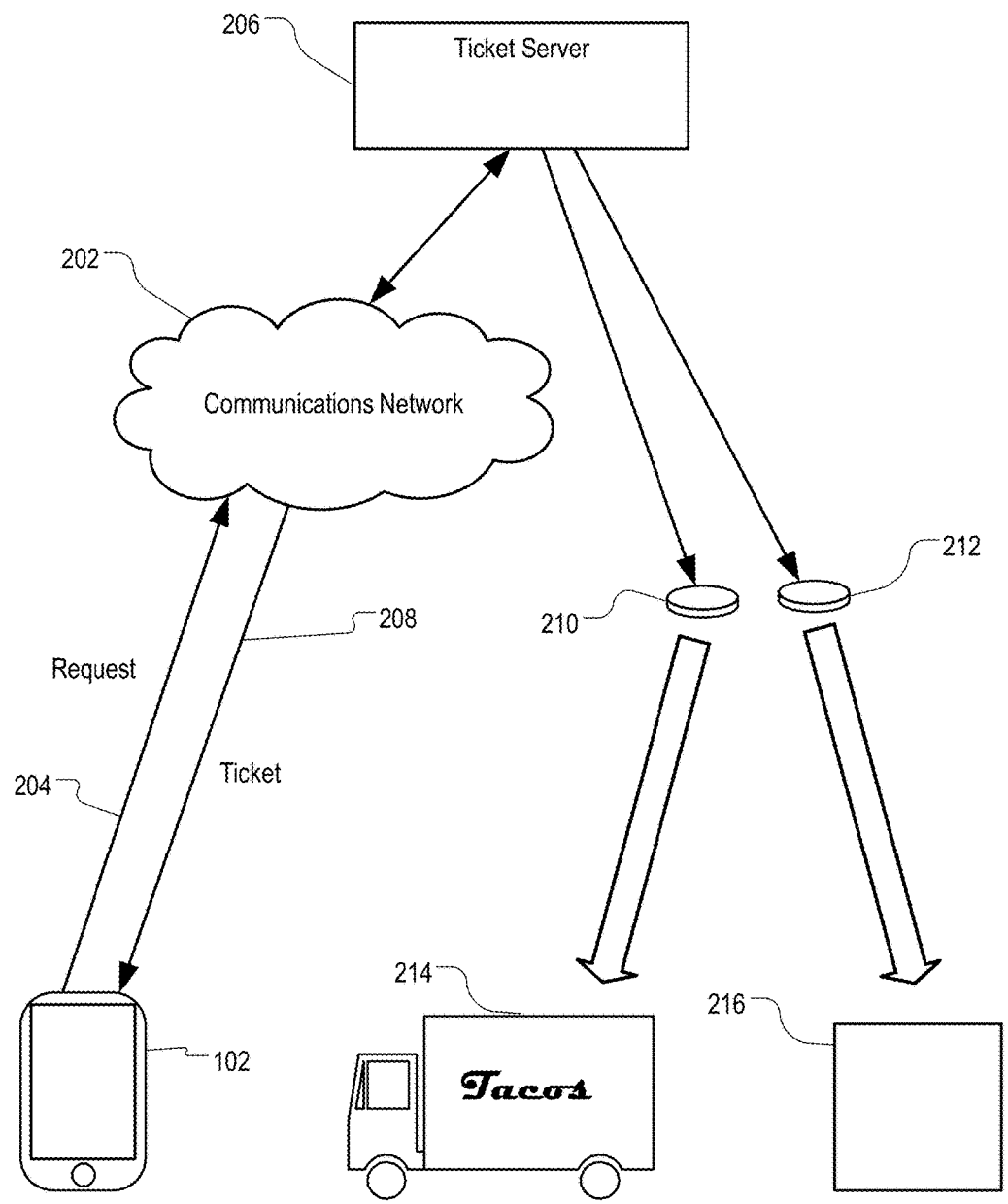
FIG. 2 is a diagram illustrating interactions between a service provider and an exemplary mobile device using a location-based ticket book.

FIG. 2 is a diagram illustrating interactions between a service provider and exemplary mobile device 102 using a location-based ticket book. Mobile device 102 can access a service provider through communications network 202. The service provider can be an entity providing a service (e.g., an exhibition event or a free lunch) that is accessible by location-based virtual tickets, e.g., tickets for the exhibition or a lunch coupon. Mobile device 102 can send request 204 to the service provider through communications network 202. Request 204 can include a payment for a ticket. Ticket server 206 of the service provider, upon receiving request 204, can issue virtual ticket 208.

Virtual ticket 208 can include a signal source identifier identifying one or more signal sources. Virtual ticket 208 can be location-based, usable to access a service at a location where a beacon signal of a signal source can be detected. Virtual ticket 208 can include virtual pass 104 or information (e.g., a message) for generating virtual pass 104. Mobile device 102 can store virtual ticket 208 in a virtual ticket book on a storage device on mobile device 102 or remotely on a server.

The service provider can distribute signal sources 210 and 212 to various locations. In some implementations, signal sources 210 and 212 are RF signal transmitters. For example, signal sources 210 and 212 can be Institute of Electrical and Electronics Engineers (IEEE) 802.11u compliant Wi-Fi™ access points. In some implementations, signal sources 210 and 212 can be Bluetooth™ low energy (BTLE) or near field communication (NFC) beacons. Signal sources 210 and 212 can have a same device type or different device types. Each of signal sources 210 and 212 can broadcast a beacon signal through one or more specified channels. Each of signal sources 210 and 212 can have a communication range in which the respective beacon signal is detectable by mobile devices (e.g., mobile device 102). Each communication range can correspond to a virtual fence.

Each of signal sources 210 and 212 can be a wireless beacon configured to broadcast, as a part of the beacon signal, a signal source identifier that identifies the respective signal source. The signal source identifier can be provided by ticket server 206. At least a portion of the signal source identifier can match the signal source identifier included in virtual ticket 208. Signal source 210 can be mobile. For example, signal source 210 can be a BTLE beacon placed in food truck 214. Signal source 212 can be stationary. For example, signal source 212 can be a wireless access point placed at restaurant 216.

When mobile device 102 detects a beacon signal from either signal source 210 or signal source 212, mobile device 102 can determine the signal source identifier in the beacon signal. When at least a portion of the signal source identifier matches the signal source identifier in virtual ticket 208, mobile device 102 can determine that mobile device 102 is located at a venue where mobile device 102 can use virtual ticket 208 to access a service. Mobile device can then generate a virtual pass based on virtual ticket 208. For example, mobile device 102 can display a barcode image representing a coupon redeemable at food truck 214 or restaurant 216, play a coded audio message, or create a vibration prompt.

In some implementations, one or more intermediaries can facilitate communications between mobile device 102 and the service provider. The intermediaries can be an advertisement company, a public relations company, or an employer having an employee incentive program. The intermediaries can receive virtual tickets in bulk from the service provider, and distribute the virtual tickets to multiple mobile devices.

Exemplary Data Structures

Figure 3A:
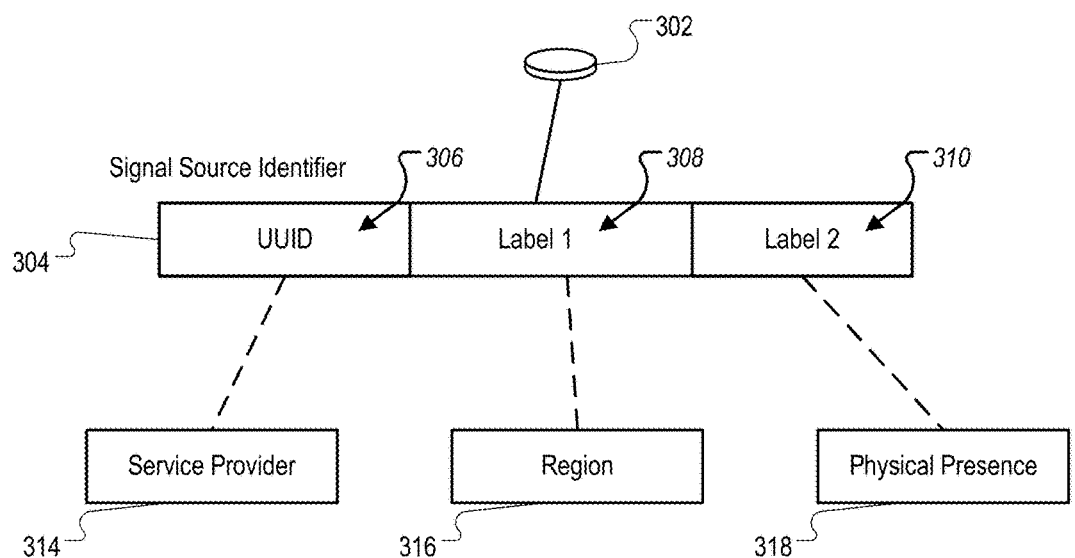
FIGS. 3A and 3B are diagram illustrating exemplary structures of a signal source identifier and a virtual ticket as used in a location-based ticket book service.

FIG. 3A illustrates an exemplary structure of a signal source identifier as used in a location-based ticket book service. Signal source 302 can be a signal source configured to broadcast signal source identifier 304 in a beacon signal. Signal source 302 can be signal source 110 of FIG. 1, or signal source 210 or 212 of FIG. 2. Signal source identifier 304 can be a programmable data structure having multiple portions. A first portion of signal source identifier 304 can include a universally unique identifier (UUID). The UUID can be a number having a specified size (e.g., 128 bits). The UUID can be unique for a group of signal sources designated to represent service provider 314, and uniform among the signal sources in the group. For example, the UUID can correspond to a business operating food truck 214 and restaurant 216. A mobile device (e.g., mobile device 102) that has detected signal source identifier 304 broadcast by any signal source and identified the UUID corresponding to the business can present a virtual pass to obtain service from the business.

Signal source identifier 304 can have a second portion and a third portion for storing labels for tiered services. Service provider 314 may issue virtual tickets that are customized based on locations having tiered granularities. Each of the second portion and third portion of signal source identifier 304 can represent a tier. Each tier can have a different geographic granularity. For example, service provider 314 may have multiple physical presences in multiple regions. Signal source identifier 304 can have a second portion and a third portion for storing information related to the multiple regions and multiple physical presences. The second portion of signal source identifier 304 can store label 308 that corresponds to region 316 (e.g., California) where service provider 314 has one or more physical presences. The third portion of signal source identifier 304 can store label 310 that corresponds to physical presence 318 (e.g., food truck 214) located in the region. Labels 308 and 310 can cause mobile device 102 to present different virtual passes at different locations. For example, mobile device 102 can present a store card valid in shops in California upon detecting a signal source identifier that includes label 308 representing California.

Each of the second and third portions can have a same size or different sizes. The sizes of the portions of signal source identifier 304 can be determined by the protocol for broadcasting signal source identifier 304 as beacons. In some implementations, the sizes of the first, second, and third portions of signal source identifier 304 can be 16 bytes, one byte, and four bytes, respectively. In some implementations, one or more of the second or third portion of signal source identifier 304 can be empty.

Figure 3B:
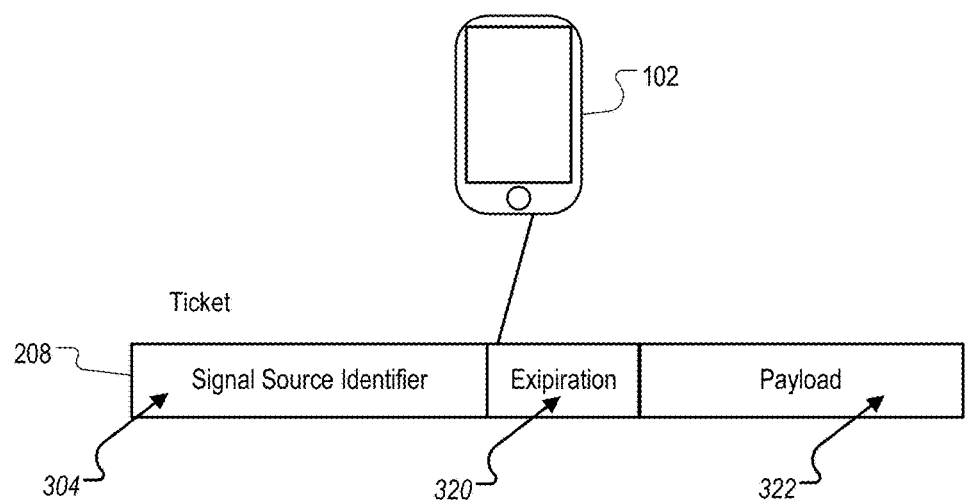

FIG. 3B is a diagram illustrating exemplary structure of virtual ticket 208 as used in a location-based ticket book service. Virtual ticket 208 can be stored in location-based ticket book of mobile device 102. The location-based ticket book can include multiple virtual tickets.

Virtual ticket 208 can include signal source identifier 304, expiration time 320, and payload 322. Expiration time 320 can specify a time that virtual ticket 208 expires (e.g., ceases to be valid at a service provider). Payload 322 can include a message provided by the service provider, an encoding indicator, and a ticket type.

The message can be a message that the service provider can identify as usable to access a service. For example, the message can be an encoded string indicating a discount amount for a coupon, or an encoded string indicating a passenger name, flight number, and cabin class of an airline ticket. The message can be an image, or an encoded sound recording. The encoding indicator can indicate a manner in which the message is presented as a machine-readable virtual pass. For example, the encoding indicator can indicate that the message shall be encoded into a virtual pass for presentation as a linear barcode (e.g., Codabar) image or a two-dimensional barcode (e.g., Data Matrix) image. The ticket type can indicate a type of virtual ticket 208, which can be used to determine a time window around expiration time 320. For example, an airline ticket type of virtual ticket 208 can indicate that the time window in which virtual ticket 208 is value is X hours before an Y hours after boarding time.

Exemplary Device Components

Figure 4:
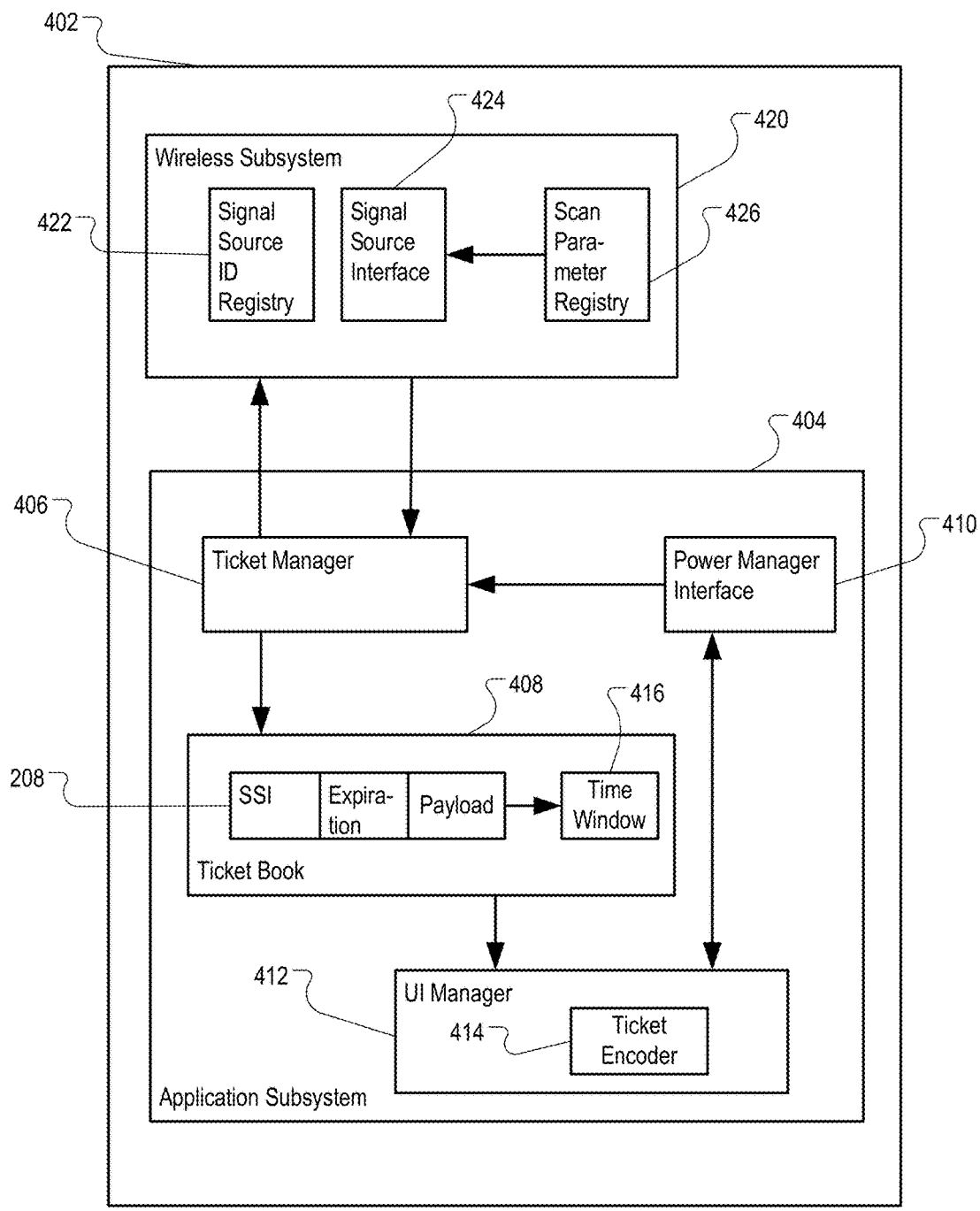
FIG. 4 is a block diagram illustrating components of an exemplary location-based ticket book subsystem of a mobile device.

FIG. 4 is a block diagram illustrating components of exemplary location-based ticket book subsystem 402 of mobile device 102. Subsystem 402 can include application subsystem 404. Application subsystem 404 can include one or more processors (e.g., application processors) configured to execute an application program for managing a location-based ticket book. Application subsystem 404 can include ticket manager 406. Ticket manager 406 is a component of application subsystem 404 configured to communicate with a server (e.g., ticket server 206) of one or more computers and receive one or more virtual tickets from the server. The server can issue a virtual ticket for accessing a service from a service provider. Receiving the virtual ticket can include downloading the virtual ticket from the server. The virtual ticket can be virtual ticket 208, including a signal source identifier. Ticket manager 406 can store the virtual ticket on a storage device in ticket book 408. Ticket book 408 can store one or more virtual tickets. Ticket manager 406 can register the signal source identifier of virtual ticket 208 at wireless subsystem 420.

Wireless subsystem 420 is a component of subsystem 402 that includes an antenna, a wireless processor (e.g., a baseband processor, Wi-Fi™ processor, or Bluetooth™ processor), and software or firmware that causes the wireless processor to perform operations of scanning wireless communication channels for signals, and notifying application subsystem when a registered signal source identifier is detected in a signal. Wireless subsystem 420 can include signal source identifier registry 422. Signal source identifier registry 422 can store one or more signal source identifiers for scanning. Wireless subsystem 420 can include signal source interface 424. Signal source interface 424 is a component of wireless subsystem 420 including hardware and software configured to scan one or more communication channels for signals (e.g., beacon signals) from signal sources, to detect signal source identifiers from the scans, and to match the detected signal source identifiers with the signal source identifiers stored in signal source identifier registry 422. Wireless subsystem 420 can include scan parameter registry 426 configured to store an entry threshold (M), an exit threshold (N), or both. Signal source interface 424 can generate a notification when a signal source identifier matching one of the signal source identifiers stored in signal source identifier registry 422 is detected in at least M scans, or is undetected in at least N scans. The notification can include the matching signal source identifier.

Wireless subsystem 420 can provide the notification to application subsystem 404. The notification can include one or more signal source identifiers for which a match is detected. Ticket manager 406 of application subsystem 404 can receive the notification and determine the signal source identifier from the notification. Ticket manager 406 can determine that the signal source identifier matches the signal source identifier of virtual ticket 208 stored in ticket book 408.

Ticket manager 406, upon determining the match, can inform power manager interface 410 that virtual ticket 208 is at a location where virtual ticket 208 can be presented. Power manager interface 434 is a component of application subsystem 404 configured to communicate with a power manager of mobile device 102 and, if virtual ticket 208 can be presented, causes application subsystem 404 to present virtual ticket 208 upon an activation event (e.g., a power up event received from the power manager).

Application subsystem 404 can include user interface manager 436. User interface manager 412 is a component of application subsystem 404 configured to receive a user input for activating mobile device 102 (e.g., by pressing a home button or making a gesture across a touch-sensitive surface of mobile device 102 to unlock the surface). In addition, user interface manager 412 can be configured to present a virtual pass included in virtual ticket 208 or generated based on a message in virtual ticket 208 for display on a display device. User interface manager 412 can include ticket encoder 414. Ticket encoder 414 is a component of user interface manager 412 configured to determine an encoding scheme based on encoding indicator in the payload of virtual ticket 208. Ticket encoder 414 can then generating the virtual pass based on the message in virtual ticket 208 using the encoding scheme.

In some implementations, ticket manager 406 can determine time window 416 for associating with virtual ticket 208. Ticket manager 406 can determine time window 416 based on an expiration time of virtual ticket 208 and a ticket type of virtual ticket 208. Upon determining that time window 416 has closed, ticket manager 406 can delete virtual ticket 208 or mark virtual ticket 208 as invalid. Time window 416 can be a point in time (e.g., ending 23:59:59 on Dec. 31, 20xx, at a given time zone) or a time period (e.g., beginning at 00:00:01 and ending at 23:59:59 on Dec. 31, 20xx at a given time zone). If time window 416 is a time period, ticket manager 406 can register the signal source identifier with wireless subsystem 420 upon determining that a clock of mobile device 102 has reached the beginning time of the time period.

Exemplary Procedures

Figure 5:
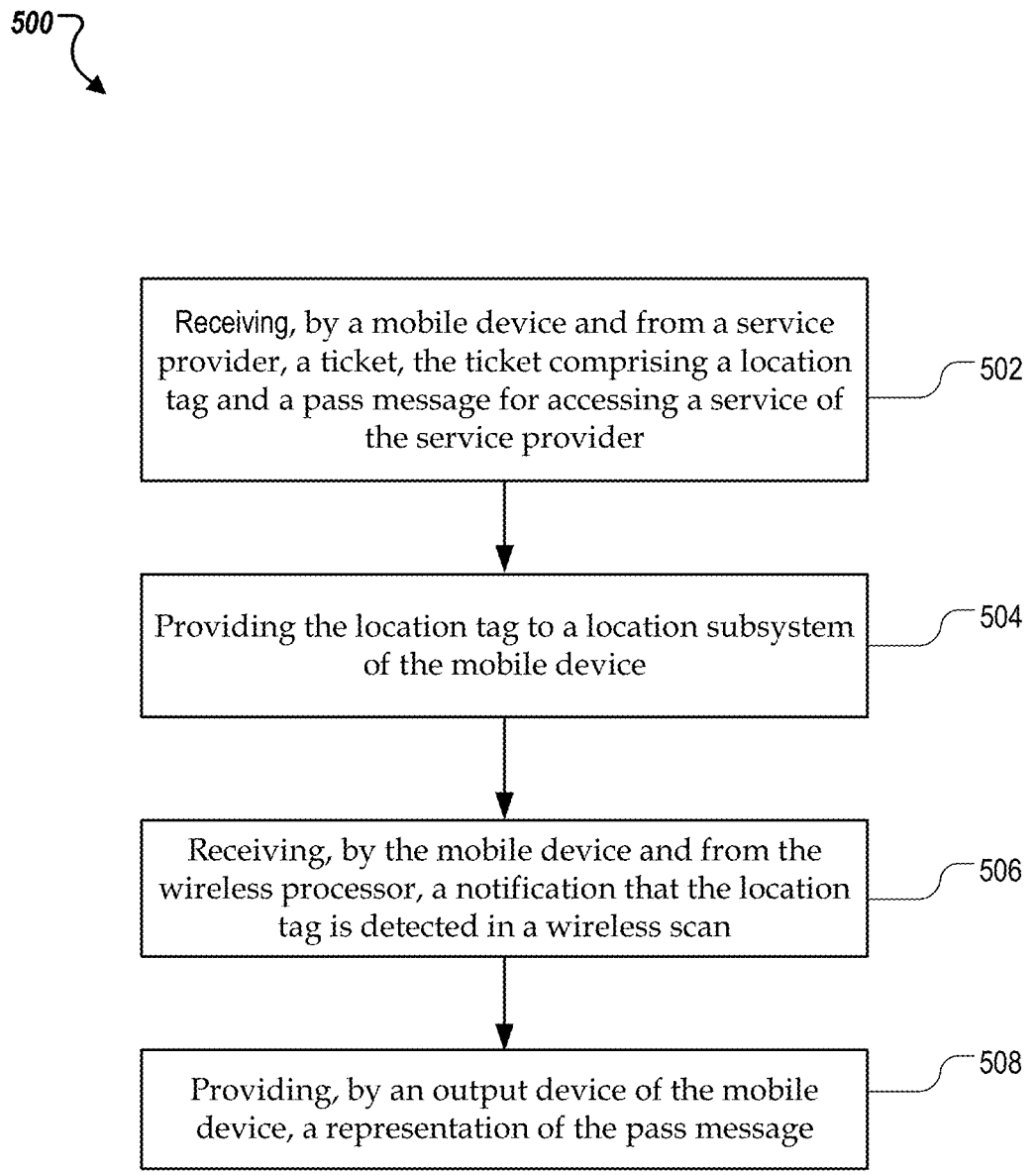
FIG. 5 is a flowchart of an exemplary procedure of location-based ticket book service.

FIG. 5 is a flowchart of exemplary procedure 500 of non-intrusive region notification. Procedure 500 can be performed by mobile device 102.

Mobile device 102 can receive (502), from a service provider, a ticket. The ticket can be a virtual ticket (e.g., virtual ticket 208) including a signal source identifier and a message for accessing a service of the service provider. For example, the ticket can be a virtual ticket for boarding a vehicle or attending an event, a store card, or a coupon. The signal source identifier (e.g., signal source identifier 304) can identify a signal source being associated with the service provider. The signal source identifier can include a UUID and one or more labels of the signal source. The signal source can be an access point of a wireless local area network (WLAN) or a wireless transmitter of a personal area network (PAN). For example, the signal source can be a BTLE beacon that can be placed on a vehicle, e.g., an airplane, a cruise ship, or a truck. In some implementations, the ticket can be associated with a timestamp (e.g., expiration time 320) specifying a time the service from the service provider is available or will expire.

Mobile device 102 can provide (504) the signal source identifier to a wireless subsystem (e.g., wireless subsystem 420) of mobile device 102. The wireless subsystem can execute a procedure for monitoring wireless signals from signal sources using a wireless processor of mobile device 102. The procedure can be a background scanning procedure that executes periodically even when mobile device 102 is in a power-saving operating mode. Providing the signal source identifier to the wireless subsystem can include providing the signal source identifier (e.g., the UUID and one or more labels) to the background procedure for scanning.

Mobile device 102 can receive (506), from the wireless processor of mobile device 102, a notification that the signal source identifier is detected in a wireless scan, indicating that mobile device 102 is located within a communication range of the signal source. Receiving the notification can include receiving, from the wireless processor, a signal indicating that the wireless processor detected at least one of the signal source identifier as provided in the list of signal source identifiers. In some implementations, receiving the notification can include receiving, from the wireless processor, a list of one or more signal source identifiers detected by the wireless processor, and determining that the signal source identifier is among the received list.

In response to an input requesting a service of the service provider, mobile device 102 can provide (508), using an output device of mobile device 102, a representation of the message. The input can be a user input. The user input can be a user activation of a display surface of mobile device 102 using home button 114 of mobile device 102. The user input can be a user gesture on a touch-sensitive surface of mobile device 102 to lock or unlock the touch-sensitive surface. The user input can be a user selection, from a quick-access menu, an option for presenting a message in payload 322 of virtual ticket 208.

In some implementations, providing the representation of the message can include generating a barcode image based on the message, and providing the barcode image as the representation for display on a display surface of mobile device 102. In some implementations, before providing the representation of the message, mobile device 102 can confirm that a current time is within a time window that is determined based on a timestamp in the ticket. Mobile device 102 provides the representation of the message if the current time is within the time window.

Mobile device 102 can determine that mobile device 102 has exited a venue where virtual ticket 208 can be used to access a service of the service provider. Mobile device 102 can determine that the signal source identifier in virtual ticket 208 is no longer detectable by the wireless processor. In response, mobile device 102 can stop providing the representation of the message (e.g., the barcode image) for display. In some implementations, determining that the signal source identifier is no longer detectable can include creating an exit virtual fence based on the signal source identifier for scanning by the wireless processor. Mobile device 102 can determine that the signal source identifier is no longer detectable upon receiving, from the wireless processor, a notification that mobile device has exited the as defined by the signal source identifier by entering the exit fence. In some implementations, mobile device 102 can cause the procedure to monitor a signal from the detected signal source periodically (e.g., continuously or every X seconds or minutes). Mobile device 102 can determine that the signal source identifier is no longer detectable upon a threshold number of failures of detecting the signal from the signal source.

In some implementations, virtual ticket 208 can include an indicator specifying whether the signal source is stationary (e.g., signal source 212 at restaurant 216) or mobile (e.g., signal source 210 on food truck 214). When the indicator specifies that the signal source is stationary, mobile device 102 can determine that the signal source identifier is no longer detectable by the wireless processor based on a reading of a motion sensor of mobile device 102. The reading can indicate that mobile device 102 has moved. The reading can trigger the wireless processor to scan for the signal from the signal source. If the scan fails to find the signal, mobile device 102 can determine that an exit of the venue has occurred, and stop presenting the message of virtual ticket 208.

Exemplary Mobile Device Architecture

Figure 6:
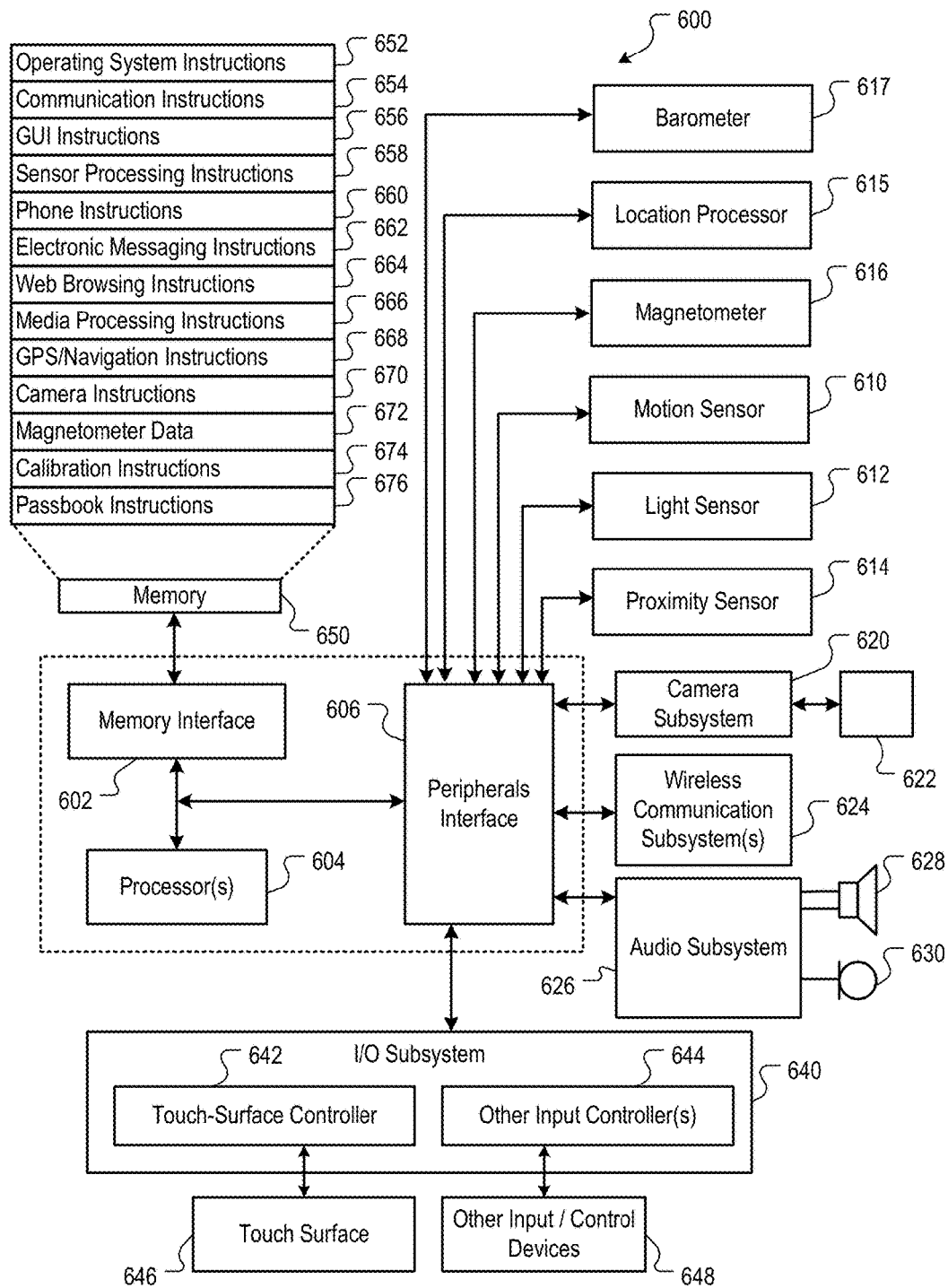
FIG. 6 is a block diagram illustrating an exemplary device architecture of a mobile device implementing the features and operations of FIGS. 1-5.

FIG. 6 is a block diagram illustrating exemplary device architecture 600 of mobile device 102 implementing the features and operations of FIGS. 1-5. Mobile device 102 can be a laptop computer, a tablet computer, a smart phone, or a wearable computing device (e.g., a smart wristwatch). Mobile device 102 can include memory interface 602, one or more data processors, image processors and/or processors 604, and peripherals interface 606. Memory interface 602, one or more processors 604 and/or peripherals interface 606 can be separate components or can be integrated in one or more integrated circuits. Processors 604 can include one or more application processors and one or more wireless processors. The various components in mobile device 102, for example, can be coupled by one or more communication buses or signal lines.

Sensors, devices, and subsystems can be coupled to peripherals interface 606 to facilitate multiple functionalities. For example, motion sensor 610, light sensor 612, and proximity sensor 614 can be coupled to peripherals interface 606 to facilitate orientation, lighting, and proximity functions of the mobile device. Location processor 615 (e.g., GPS receiver) can be connected to peripherals interface 606 to provide geopositioning. Electronic magnetometer 616 (e.g., an integrated circuit chip) can also be connected to peripherals interface 606 to provide data that can be used to determine the direction of magnetic North. Thus, electronic magnetometer 616 can be used as an electronic compass. Motion sensor 610 can include one or more accelerometers configured to determine change of speed and direction of movement of the mobile device. Barometer 617 can include one or more devices connected to peripherals interface 606 and configured to measure pressure of atmosphere around the mobile device.

Camera subsystem 620 and an optical sensor 622, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 624, which can include radio frequency receivers and transmitters and/or optical (e.g., infrared) receivers and transmitters. The specific design and implementation of the communication subsystem 624 can depend on the communication network(s) over which a mobile device is intended to operate. For example, a mobile device can include communication subsystems 624 designed to operate over a GSM network, a GPRS network, an EDGE network, a Wi-Fi™ or WiMax™ network, and a Bluetooth™ network. In particular, the wireless communication subsystems 624 can include hosting protocols such that the mobile device can be configured as a base station for other wireless devices.

Audio subsystem 626 can be coupled to a speaker 628 and a microphone 630 to facilitate voice-enabled functions, such as voice recognition, voice replication, digital recording, and telephony functions. Audio subsystem 626 can be configured to receive voice commands from the user.

I/O subsystem 640 can include touch surface controller 642 and/or other input controller(s) 644. Touch surface controller 642 can be coupled to a touch surface 646 or pad. Touch surface 646 and touch surface controller 642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 646. Touch surface 646 can include, for example, a touch screen.

Other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of speaker 628 and/or microphone 630.

In one implementation, a pressing of the button for a first duration may disengage a lock of the touch surface 646; and a pressing of the button for a second duration that is longer than the first duration may turn power to mobile device 102 on or off. The user may be able to customize a functionality of one or more of the buttons. The touch surface 646 can, for example, also be used to implement virtual or soft buttons and/or a keyboard.

In some implementations, mobile device 102 can present recorded audio and/or video files, such as MP3, AAC, and MPEG files. In some implementations, mobile device 102 can include the functionality of an MP3 player. Mobile device 102 may, therefore, include a pin connector that is compatible with the iPod. Other input/output and control devices can also be used.

Memory interface 602 can be coupled to memory 650. Memory 650 can include high-speed random access memory and/or non-volatile memory, such as one or more magnetic disk storage devices, one or more optical storage devices, and/or flash memory (e.g., NAND, NOR). Memory 650 can store operating system 652, such as Darwin, RTXC, LINUX, UNIX, OS X, WINDOWS, iOS, or an embedded operating system such as VxWorks. Operating system 652 may include instructions for handling basic system services and for performing hardware dependent tasks. In some implementations, operating system 652 can include a kernel (e.g., UNIX kernel).

Memory 650 may also store communication instructions 654 to facilitate communicating with one or more additional devices, one or more computers and/or one or more servers. Memory 650 may include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GPS/Navigation instructions 668 to facilitate GPS and navigation-related processes and instructions; camera instructions 670 to facilitate camera-related processes and functions; magnetometer data 672 and calibration instructions 674 to facilitate magnetometer calibration. The memory 650 may also store other software instructions (not shown), such as security instructions, web video instructions to facilitate web video-related processes and functions, and/or web shopping instructions to facilitate web shopping-related processes and functions. In some implementations, the media processing instructions 666 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 650. Memory 650 can store passbook instructions 676 that, when executed, can cause processor 604 to perform operations of location-based ticket book subsystem 402 as described above in reference to FIG. 4. The operations can include procedure 500 as described above in reference to FIG. 5.

Each of the above identified instructions and applications can correspond to a set of instructions for performing one or more functions described above. These instructions need not be implemented as separate software programs, procedures, or modules. Memory 650 can include additional instructions or fewer instructions. Furthermore, various functions of the mobile device may be implemented in hardware and/or in software, including in one or more signal processing and/or application specific integrated circuits.

Exemplary Operating Environment

Figure 7:
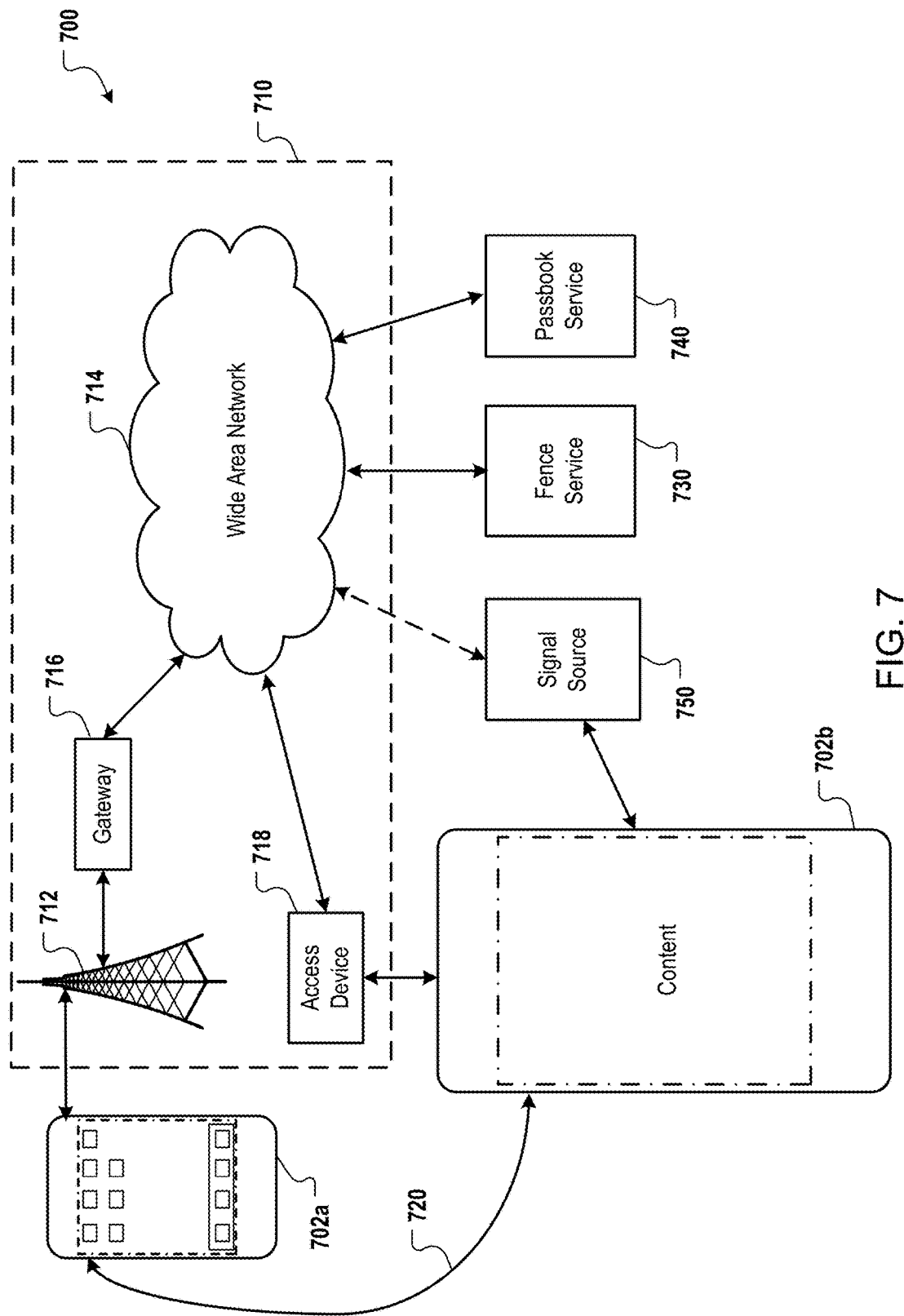
FIG. 7 is a block diagram of an exemplary network operating environment for the mobile devices implementing the features and operations of FIGS. 1-5.

FIG. 7 is a block diagram of exemplary network operating environment 700 for the mobile devices implementing the features and operations of FIGS. 1-5. Mobile devices 702a and 702b can, for example, communicate over one or more wired and/or wireless networks 710 in data communication. For example, a wireless network 712, e.g., a cellular network, can communicate with a wide area network (WAN) 714, such as the Internet, by use of a gateway 716. Likewise, an access device 718, such as an 802.11g wireless access point, can provide communication access to the wide area network 714. Each of mobile devices 702a and 702b can be mobile device 102.

In some implementations, both voice and data communications can be established over wireless network 712 and the access device 718. For example, mobile device 702a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 712, gateway 716, and wide area network 714 (e.g., using Transmission Control Protocol/Internet Protocol (TCP/IP) or User Datagram Protocol (UDP)). Likewise, in some implementations, the mobile device 702b can place and receive phone calls, send and receive e-mail messages, and retrieve electronic documents over the access device 718 and the wide area network 714. In some implementations, mobile device 702a or 702b can be physically connected to the access device 718 using one or more cables and the access device 718 can be a personal computer. In this configuration, mobile device 702a or 702b can be referred to as a "tethered" device.

Mobile devices 702a and 702b can also establish communications by other means. For example, wireless mobile device 702a can communicate with other wireless devices, e.g., other mobile devices, cell phones, etc., over the wireless network 712. Likewise, mobile devices 702a and 702b can establish peer-to-peer communications 720, e.g., a personal area network, by use of one or more communication subsystems, such as the Bluetooth™ communication devices. Other communication protocols and topologies can also be implemented.

Mobile device 702a or 702b can, for example, communicate with one or more services 730 and 740 over the one or more wired and/or wireless networks. For example, one or more virtual fence services 730 can provide fence-triggered application programs to mobile devices 702a and 702b. Passbook service 740 can provide virtual tickets, including where the virtual tickets can be activated in the form of signal source identifiers, to mobile devices 702a and 702b.

Mobile device 702a or 702b can communicate with one or more signal sources 750. Each signal source 750 can be a wireless beacon configured to broadcast a signal source identifier. The signal source identifier can include a UUID. Each signal source 750 can communicate to other devices through wide area network 714 or facilitate communication between mobile device 702a or 702b with the other devices. In some implementations, each signal source 750 can be independent from a communications network, and function solely as a beacon device.

Mobile device 702a or 702b can also access other data and content over the one or more wired and/or wireless networks. For example, content publishers, such as news sites, Really Simple Syndication (RSS) feeds, web sites, blogs, social networking sites, developer networks, etc., can be accessed by mobile device 702a or 702b. Such access can be provided by invocation of a web browsing function or application (e.g., a browser) in response to a user touching, for example, a Web object.

A number of implementations of the invention have been described. Nevertheless, it will be understood that various modifications can be made without departing from the spirit and scope of the invention.

What is claimed is:

1. A method comprising:
on a mobile device storing one or more tickets, each ticket including at least one identifier and a respective message for accessing a service of a respective service provider, the at least one identifier being associated with the service provider:
   detecting at least two identifiers based on data received by a wireless subsystem of the mobile device, the wireless subsystem executing a procedure for monitoring wireless signals using a wireless processor of the mobile device;
   determining that a first identifier of the at least two identifiers represents a first location having a first geographic granularity and a second identifier of the at least two identifiers represents a second location having a second geographic granularity;
   determining, based on the data received by the wireless subsystem, that the mobile device is located in proximity to the service provider;
   identifying, among the one or more stored tickets, a first ticket that includes an identifier that matches the geographic granularity of at least one of the two detected identifiers and includes a first message for accessing a first service of a first service provider; and then
   in response to an input requesting access to the first service, providing, by an output device of the mobile device, a representation of the first message to the first service provider.

2. The method of claim 1, wherein the input comprises:
a user activation of a display surface of the mobile device using a home button of the mobile device;
a user gesture on a touch-sensitive surface of the mobile device to lock or unlock the touch sensitive surface; or
a user selection, from a quick access menu, an option for presenting the first message.

3. The method of claim 1, wherein providing the representation of the first message comprises:
generating a barcode image from the first message; and
providing the barcode image as the representation for display on a display surface of the mobile device.

4. The method of claim 1, wherein the first ticket is a ticket for boarding a vehicle or attending an event, a store card, a boarding pass, a movie ticket, a loyalty card, an employee pass, a gymnasium access pass, a library card, a discount coupon, a retail coupon, or another kind of coupon.

5. The method of claim 1, wherein:
the first ticket is associated with a timestamp specifying a time the first service is available, and
the method comprises, before providing the representation of the first message, confirming that a current time is within a time window that is determined based on the timestamp, wherein providing the representation of the message occurs if the current time is within the time window.

6. The method of claim 1, comprising:
determining that at least one of the first identifier or the second identifier is no longer detectable; and
in response, stopping providing the representation of the first message.

7. The method of claim 1, wherein at least one of the first identifier or the second identifier corresponds to a region or a physical presence.

8. The method of claim 1, comprising detecting a third identifier, and wherein the first ticket includes an identifier that matches the geographic granularity of the third identifier.

9. The method of claim 1, wherein the first location having the first geographic granularity represents a geographic region containing the second location having the second geographic granularity.

10. A system comprising:
a mobile device; and
a non-transitory computer readable medium coupled to the mobile device, the non-transitory computer readable medium storing instructions operable to cause the mobile device to perform operations comprising:
   accessing a storage medium storing one or more tickets, each ticket including at least one identifier and a respective message for accessing a service of a respective service provider, the at least one identifier being associated with the service provider;
   detecting at least two identifiers based on data received by a wireless subsystem of the mobile device, the wireless subsystem executing a procedure for monitoring wireless signals using a wireless processor of the mobile device;
determining that a first identifier of the at least two identifiers represents a first location having a first geographic granularity and a second identifier of the at least two identifiers represents a second location having a second geographic granularity;
   determining, based on the data received by the wireless subsystem, that the mobile device is located in proximity to the service provider;
identifying, among the one or more stored tickets, a first ticket that includes an identifier that matches the geographic granularity of at least one of the two detected identifiers and includes a first message for accessing a first service of a first service provider; and then
   in response to an input requesting access to the first service, providing, by an output device of the mobile device, a representation of the first message to the first service provider.

11. The system of claim 10, wherein the input comprises:
a user activation of a display surface of the mobile device using a home button of the mobile device;
a user gesture on a touch-sensitive surface of the mobile device to lock or unlock the touchsensitive surface; or
a user selection, from a quickaccess menu, an option for presenting the message.

12. The system of claim 10, wherein providing the representation of the first message comprises:
generating a barcode image from the first message; and
providing the barcode image as the representation for display on a display surface of the mobile device.

13. The system of claim 10, wherein:
the first ticket is associated with a timestamp specifying a time the first service is available, and
the operations comprise, before providing the representation of the first message, confirming that a current time is within a time window that is determined based on the timestamp, wherein providing the representation of the message occurs if the current time is within the time window.

14. The system of claim 10, wherein the operations include detecting a third identifier, and wherein the first ticket includes an identifier that matches the geographic granularity of the third identifier.

15. The system of claim 10, wherein the first location having the first geographic granularity represents a geographic region containing the second location having the second geographic granularity.

16. A non-transitory computer-readable medium coupled to a mobile device, the non-transitory computer readable medium storing instructions operable to cause the mobile device to perform operations comprising:
   accessing a storage medium storing one or more tickets, each ticket including at least one identifier and a respective message for accessing a service of a respective service provider, the at least one identifier being associated with the service provider;
   detecting at least two identifiers based on data received by a wireless subsystem of the mobile device, the wireless subsystem executing a procedure for monitoring wireless signals using a wireless processor of the mobile device;
   determining that a first identifier of the at least two identifiers represents a first location having a first geographic granularity and a second identifier of the at least two identifiers represents a second location having a second geographic granularity;
   determining, based on the data received by the wireless subsystem, that the mobile device is located in proximity to the service provider;
   identifying, among the one or more stored tickets, a first ticket that includes an identifier that matches the geographic granularity of at least one of the two detected identifiers and includes a first message for accessing a first service of a first service provider; and then in response to an input requesting access to the first service, providing, by an output device of the mobile device, a representation of the first message to the first service provider.

17. The non-transitory computer-readable medium of claim 16, wherein the input comprises:
   a user activation of a display surface of the mobile device using a home button of the mobile device;
   a user gesture on a touch-sensitive surface of the mobile device to lock or unlock the touchsensitive surface; or
   a user selection, from a quickaccess menu, an option for presenting the message.

18. The non-transitory computer-readable medium of claim 16, wherein providing the representation of the first message comprises:
   generating a barcode image from the first message; and
   providing the barcode image as the representation for display on a display surface of the mobile device.

19. The non-transitory computer-readable medium of claim 16, wherein:
   the first ticket is associated with a timestamp specifying a time the first service is available, and
   the operations comprise, before providing the representation of the first message, confirming that a current time is within a time window that is determined based on the timestamp, wherein providing the representation of the message occurs if the current time is within the time window.

20. The non-transitory computer-readable medium of claim 16, wherein the first location having the first geographic granularity represents a geographic region containing the second location having the second geographic granularity.

* * * * *